United States Patent [19]

Lane, Jr.

[11] Patent Number: 4,640,997
[45] Date of Patent: Feb. 3, 1987

[54] MULTIPLE FUNCTION CONTROL STALK INCLUDING PIVOTABLE HEADLIGHT DIMMER SWITCH

[75] Inventor: Wendell C. Lane, Jr., Laurinburg, N.C.

[73] Assignee: Dana Corporation, Toledo, Ohio

[21] Appl. No.: 807,501

[22] Filed: Dec. 11, 1985

[51] Int. Cl.$^4$ .......................... H01H 3/16; H01H 9/00
[52] U.S. Cl. .............................. 200/61.54; 200/61.27; 200/61.85
[58] Field of Search ............... 200/61.27, 61.38, 61.54, 200/61.85, 157, 4

[56] References Cited

U.S. PATENT DOCUMENTS

| | | | |
|---|---|---|---|
| 2,133,572 | 10/1938 | Rowe | 200/61.27 |
| 2,823,272 | 2/1958 | Adams | 200/6 A |
| 3,374,321 | 3/1968 | Trarbach | 200/61.27 |
| 3,401,240 | 9/1968 | Groves | 200/6 R |
| 3,603,748 | 9/1971 | Cryer | 200/61.27 X |
| 3,892,932 | 7/1975 | Erdelitsch et al. | 200/61.27 |
| 4,006,328 | 2/1977 | Kimberlin et al. | 200/61.54 |
| 4,144,424 | 3/1979 | Takeda et al. | 200/61.54 X |
| 4,149,048 | 4/1979 | Winter et al. | 200/61.54 |
| 4,179,592 | 12/1979 | Nitsch | 200/61.27 |
| 4,204,099 | 5/1980 | Cryer | 200/4 |
| 4,238,650 | 12/1980 | Cryer et al. | 200/4 |
| 4,273,971 | 6/1981 | Tregurtha | 200/61.27 X |
| 4,293,743 | 10/1981 | Iwata et al. | 200/4 |
| 4,328,431 | 5/1982 | Usami | 307/10 R |
| 4,376,237 | 3/1983 | Long | 200/61.27 |

FOREIGN PATENT DOCUMENTS 1454282 11/1976 United Kingdom ............ 200/61.27

*Primary Examiner*—J. R. Scott
*Attorney, Agent, or Firm*—Willian Brinks Olds Hofer Gilson & Lione

[57] ABSTRACT

A multiple function control stalk for a vehicle having a pivotable headlight dimmer switch therein is disclosed. The control stalk can house a plurality of electrical switches for controlling various devices within the vehicle, such as windshield wiper and washer controls and vehicle speed or cruise controls. The control stalk is pivotally connected to a turn signal lever of the vehicle such that it can be pivoted toward the driver in a plane of movement which is generally perpendicular to the plane defined by the plane of movement of the turn signal lever itself. A two position electrical switch is provided within the control stalk. The switch includes a plunger which is engaged by pivoting movement of the control stalk relative to the turn signal arm to move from a first position to a second position, and vice versa. The switch can be utilized to control the operating condition of the headlights, namely, low beam or high beam, or other controlled device in the vehicle.

19 Claims, 5 Drawing Figures

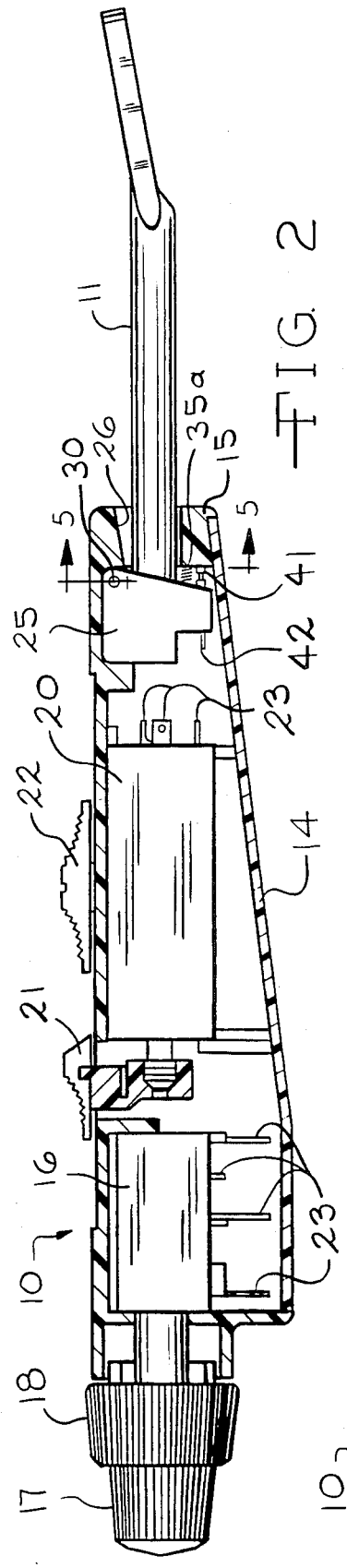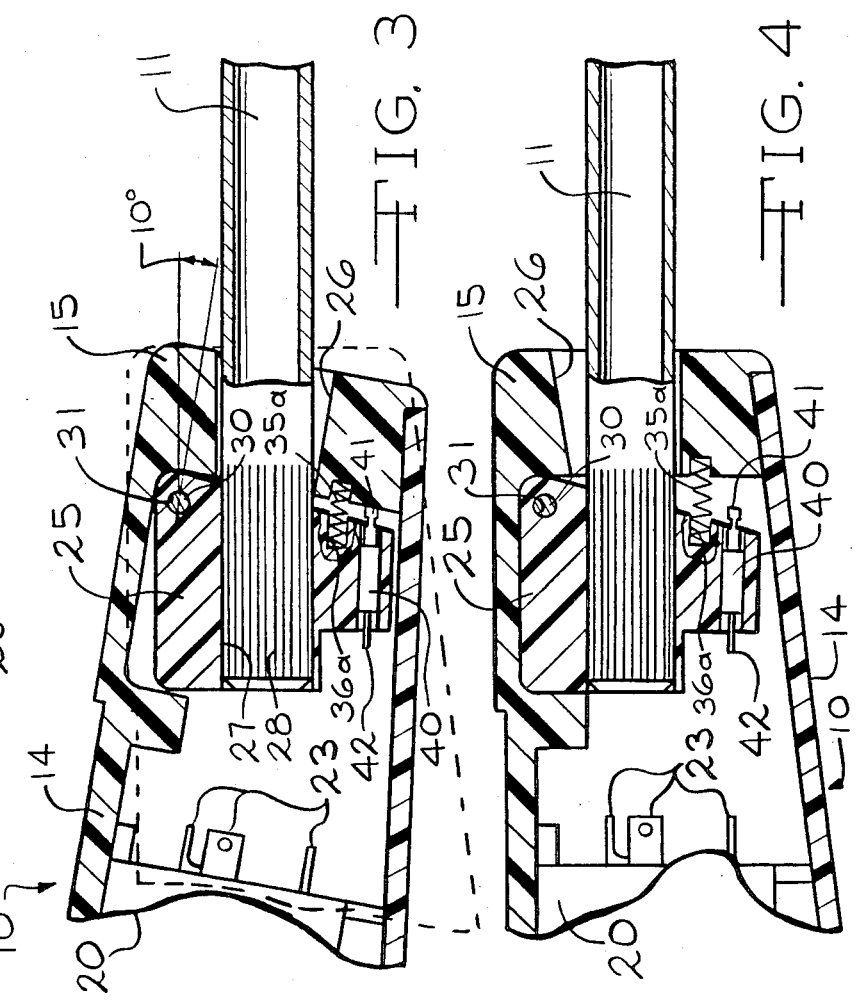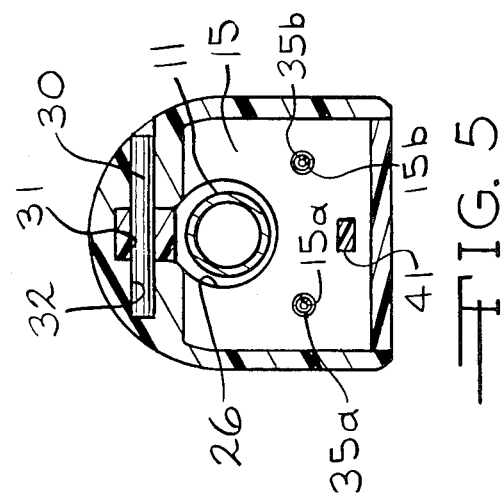

MULTIPLE FUNCTION CONTROL STALK INCLUDING PIVOTABLE HEADLIGHT DIMMER SWITCH

BACKGROUND OF THE INVENTION

The present invention relates in general to switch mechanisms for regulating the operation of various devices in vehicles and in particular to a multiple function control stalk including a pivotable headlight dimmer switch.

Many modern automobiles are provided with a single lever extending outwardly from the steering column, the manipulation of which controls both the actuation of the turn signal lights of the vehicle and the operating condition of the vehicle headlights, namely, low beam or high beam. The lever is connected to a combined switch assembly located within the steering column. The combined switch assembly includes a turn signal switch for controlling the actuation of the turn signal lights and a headlight dimmer switch for controlling the operating condition of the headlights. To actuate one or the other of the turn signal lights, the lever is moved upwardly or downwardly by the driver so as to define a first plane of movement, generally parallel to the plane defined by the steering wheel, in which the lever is articulated for actuating the turn signal switch in the combined switch assembly. Typically, the lever is moved upwardly to actuate the right turn signal lights and downwardly to actuate the left turn signal lights. To change the operating condition of the headlights from one state to the other, the lever is pivoted toward the driver so as to define a second plane of movement, generally perpendicular to the first plane of movement, in which the lever is articulated for actuation of the headlight dimmer switch in the combined switch assembly. Typically, successive pivoting of the lever toward the driver causes the operating condition of the headlights to alternate between low beam and high beam.

Although this combined switch assembly, wherein the headlight dimmer switch is actuated by movement of the turn signal lever, is common in modern automobiles, most recreational vehicles and older automobiles are provided with the older foot-actuated type of headlight dimmer switch, which is normally mounted in the floor of the driver compartment. Persons who are accustomed to the turn signal lever type of headlight dimmer switch in modern vehicles may become confused or distracted when trying to locate the floor mounted type of headlight dimmer switch in recreational vehicles or older automobiles which they may be driving. Accordingly, it would be desirable to provide a device for mounting a headlight dimmer switch on the turn signal lever of such recreational vehicles or older automobiles to replace the existing floor mounted switch therein, and further to provide such a device which can be quickly and easily installed.

It is well known to secure a multiple function control stalk to the outermost end of a turn signal lever in a vehicle. The control stalk typically carries a plurality of electrical switches which permit a driver to regulate the operation of several devices within the vehicle. The controlled devices can include the off/low speed/high speed windshield wiper controls, the delay windshield wiper controls, the windshield washer controls, and the vehicle speed or cruise controls. In the absence of such multiple function control stalks, the various switches which regulate the operation of these controlled devices would be inconveniently scattered about the dashboard of the vehicle or elsewhere, especially those switches which regulate devices that are not provided as standard equipment on the vehicle. The turn signal lever itself can be connected within the steering column either to a combined switch assembly, which controls both the turn signal lights and the operating condition of the headlights as described above, or to a conventional turn signal switch assembly, which controls only the turn signal lights and is common in recreational vehicles and older automobiles.

One important consideration in the design of a multiple function control stalk is that the operation thereof must be simple and easy for the vehicle driver. Otherwise, the driver may be distracted from driving the vehicle while attempting to manipulate one of the switches. Obviously, a very unsafe condition is created when this occurs. Unfortunately, as more and more switches are provided on the control stalk, the operation thereof becomes increasingly complicated. A second important consideration in the design of a multiple function control stalk is the ease of installation. Frequently, such installation requires the removal of many components located within the steering column so that additional control components can be inserted therein. Consequently, the installation process is complicated, expensive, and time consuming.

SUMMARY OF THE INVENTION

The present invention relates to a multiple function control stalk for a vehicle having a pivotable headlight dimmer switch therein. The control stalk can house a plurality of electrical switches for controlling various devices within the vehicle, such as windshield wiper and washer controls and vehicle speed or cruise controls. The control stalk is pivotally connected to a turn signal lever of the vehicle such that it can be pivoted toward the driver in a plane of movement which is generally perpendicular to the plane defined by the plane of movement of the turn signal lever itself. A two position electrical switch is provided within the control stalk. The switch includes a plunger which is engaged by pivoting movement of the control stalk relative to the turn signal arm to move from a first position to a second position, and vice versa. The switch can be utilized to control the operating condition of the headlights, namely, low beam or high beam, or other controlled device in the vehicle.

It is an object of the present invention to provide an improved multiple function control stalk which is pivotally mounted on a turn signal lever of a vehicle and includes an electrical switch actuable upon such pivoting movement to control the operation of a device within the vehicle.

It is another object of the present invention to provide such an improved control stalk which is easily located and manipulated by a vehicle driver while the vehicle is being driven.

It is a further object of the present invention to provide such an improved control stalk which is simple and inexpensive to install.

Other objects of the present invention will become apparent to those skilled in the art from the following detailed description of the preferred embodiment, when read in light of the accompanying drawings.

BRIEF DESCRIPTION OF THE DRAWINGS

FIG. 2 is a partial sectional elevational view of the multiple function control stalk and turn signal lever of FIG. 1, the headlight dimmer switch therein being illustrated an extended position.

FIG. 3 is an enlarged fragmentary sectional elevational view of the multiple function control stalk of FIG. 1 shown in a pivoted position relative to the turn signal lever, the headlight dimmer switch therein being illustrated in a compressed position.

FIG. 4 is an enlarged fragmentary sectional elevational view of the multiple function control stalk and turn signal lever of FIG. 2, the headlight dimmer switch therein shown in a retracted position.

FIG. 5 is a sectional elevational view taken along line 5—5 of FIG. 2.

DETAILED DESCRIPTION OF THE PREFERRED EMBODIMENT

Figure 1:
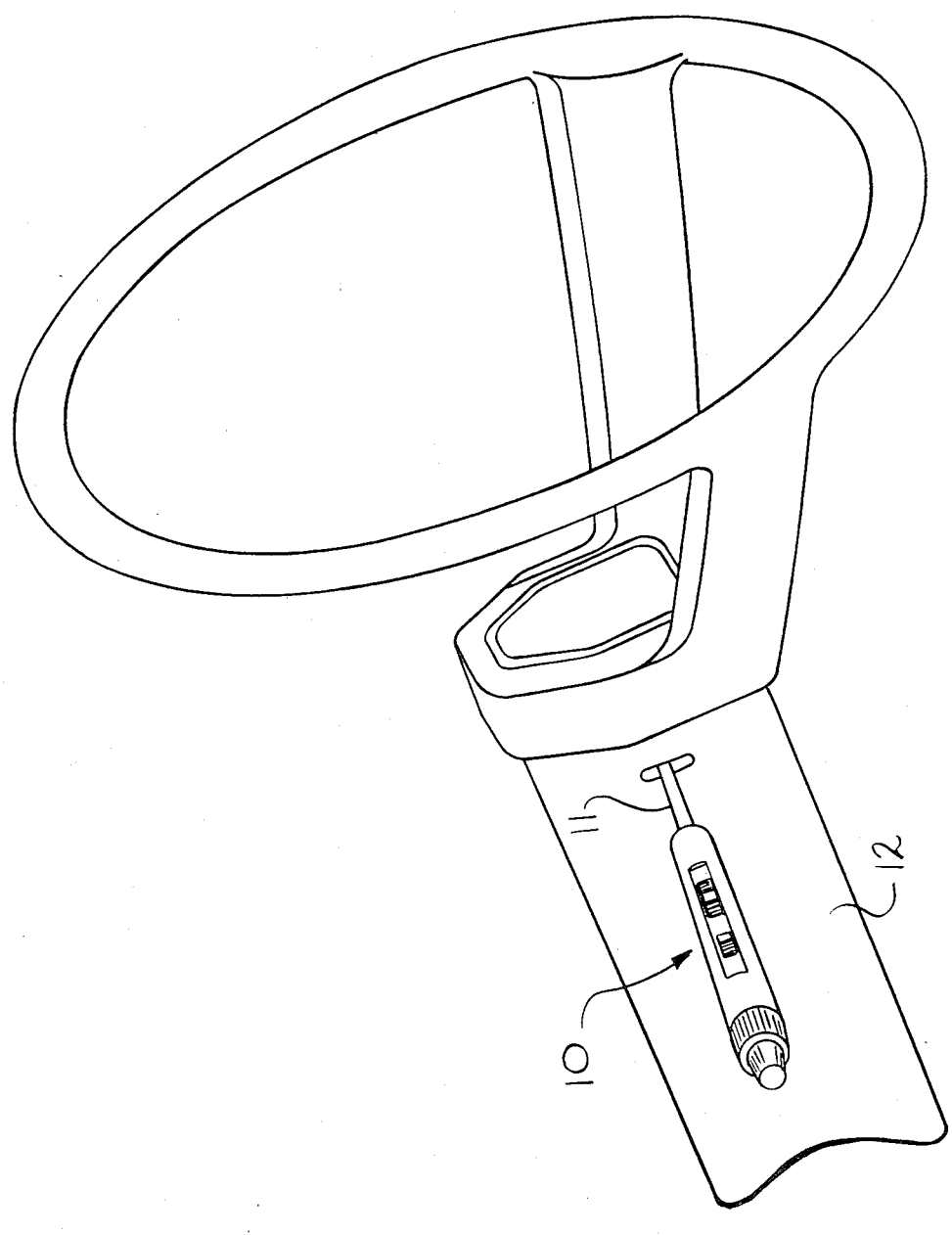
FIG. 1 is a perspective view of a portion of a steering column of a vehicle having a multiple function control stalk in accordance with the present invention mounted thereon.

Referring now to FIG. 1, there is illustrated an improved multiple function control stalk, indicated generally at 10, in accordance with the present invention. The control stalk 10 is mounted on a hollow turn signal lever 11 which, in turn, is connected to a conventional turn signal switch assembly (not shown) disposed within a steering column 12 of a vehicle. A steering wheel 13 is mounted on the steering column 12. The control stalk 10 and the turn signal lever 11 are adapted to be moved upwardly or downwardly together to actuate the turn signal switch assembly and, accordingly, the turn signal lights (not shown) of the vehicle in a well known manner. Throughout this movement, the control stalk 10 and the turn signal lever 11 are maintained in longitudinal alignment, as illustrated in FIG. 1. Such movement of the control stalk 10 and the turn signal lever 11 defines a first plane of movement which is generally parallel to the plane defined by the steering wheel 13. Although the present invention will be described and illustrated in terms of a means for controlling the operating condition of the headlights (not shown) of the vehicle, it must be understood that the present invention can be utilized to control the operation of any other device on the vehicle.

Referring now to FIGS. 2 through 5, the structure of the control stalk 10 is more clearly illustrated. The control stalk 10 includes a housing 14 which provides an enclosure for a plurality of electrical switch mechanisms. The electrical switch mechanisms are adapted to regulate the operation of various devices (not shown) located in the vehicle. For example, a first switch assembly 16 can be controlled by the vehicle driver through the use of a pair of concentric rotatable knobs 17 and 18 disposed longitudinally at the outermost end of the control stalk 10. The switch assembly 16 may be utilized to control the operation of the vehicle windshield wipers, including the amount of delay between successive cycles of operation thereof. A second switch assembly 20 can be controlled by the vehicle driver through the use of a pair of longitudinally slidable handles 21 and 22 disposed on the upper surface of the control stalk 10. The second switch assembly 20 can be utilized to control the operation of a vehicle speed or cruise control device. Both the first and second switch assemblies 16 and 20, respectively, can include one or more electrical contacts 23 extending outwardly thereof within the housing 14. The contacts 23 are adapted to be electrically connected to respective wires (not shown) which, in turn, are connected to the respective controlled devices. The switch assemblies 16 and 20 form no part of the present invention, but rather may be included within the housing 14 together with other electrical switch assemblies (not shown) if desired.

A third switch assembly 25 is also provided within the housing 14. The third switch assembly 25 is secured to the turn signal lever 11, which extends inwardly through an innermost end wall 15 of the housing 14 through an aperture 26 formed therein. The upper surface of the aperture 26 tapers inwardly from the end wall 15 to the interior thereof, for a purpose described below. As shown most clearly in FIGS. 3 and 4, the attachment of the third switch assembly 25 to the turn signal lever 11 can be accomplished by forming a central aperture 27 through the third switch assembly 25 in a direction parallel to the longitudinal axis of the turn signal lever 11. The turn signal lever 11 can be provided with a knurled end portion 28 sized to fit snugly within the central aperture 27 so as to frictionally engage the third switch assembly 25 and prevent relative movement therebetween. Thus, the third switch assembly 25 is secured to the turn signal lever 11 such that it cannot be rotated or otherwise moved relative thereto.

A pin 30 is provided to pivotally connect the third switch assembly 25 to the housing 14 of the control stalk 10. As shown most clearly in FIG. 5, the central portion of the pivot pin 30 extends through an aperture 31 formed through an upper portion of the third switch assembly 25 in a direction generally perpendicular to the longitudinal axis of the turn signal lever 11. The outer ends of the pivot pin 31 are journalled in a corresponding aperture 32 formed partially through the housing 14. One side of the housing aperture 32 is open to the exterior of the housing 14 to permit the insertion of the pivot pin 30 therethrough. The pivot pin 30 is sized to fit snugly within the third switch assembly aperture 31 and the housing aperture 32 so as to militate against the removal thereof during use. As shown in FIGS. 2 through 4, the control stalk 10 can be pivoted relative to the turn signal lever 11 from a first position, wherein the longitudinal axes of the control stalk 10 and the turn signal lever 11 are parallel (FIGS. 2 and 4), to a second position, wherein the longitudinal axes of the control stalk 10 and the turn signal lever 11 are disposed at an angle (FIG. 3). Typically, the tapered upper surface of the aperture 26 formed through the end wall 15 limits the maximum angle of displacement of the longitudinal axes to approximately ten degrees, as shown in FIG. 3.

A biasing means is provided to normally maintain the control stalk 10 in its first position, i.e., parallel to the turn signal lever 11. In the preferred embodiment of the invention, the biasing means includes a pair of springs 35a and 35b, as shown in FIGS. 2 through 5. One end of one spring 35a is received in a recess 36a formed in the third switch assembly 25, while the other end of that same spring 35a is received in a recess 15a formed in the end wall 15 of the housing 14. Similarly, one end of the other spring 35b is received in a recess (not shown) formed in the third switch assembly 25, while the other end of the other spring 35b is received in a recess 15b formed in the innermost end wall 15 of the housing 14. As shown most clearly in FIG. 5, the springs 35a and 35b are disposed below the central aperture 27 formed through the third switch assembly 25 and on opposite sides thereof. The springs 35a and 35b exert a force against the end wall 15 of the housing 14 so as to urge the control stalk 10 toward its first position illustrated in FIGS. 2 and 4. However, the urging of the springs 35a and 35b can be overcome by the driver of the vehicle upon application of a force of sufficient magnitude against the outermost end of the control stalk 10 directed upwardly so as to move the control stalk 10 to its second position illustrated in FIG. 3. When the force is removed, the springs 35a and 35b will cause the control stalk 10 to return to its first position. The range of movement of the control stalk 10 from its first position to its second position defines a second plane of movement of the control stalk 10, which is generally perpendicular to the above-discussed first plane of movement of the control stalk 10 and the turn signal lever 11.

The third switch assembly 25 includes an electrical switch 40 retained therein. A longitudinally movable plunger 41 is enclosed within the switch 40 and extends outwardly therefrom toward the end wall 15. The plunger 41 is movable between an extended position, illustrated in FIG. 2 wherein the tip of the plunger 41 is disposed near the end wall 15, and a retracted position, illustrated in FIG. 4 wherein the tip of the plunger 41 is spaced apart from the end wall 15. To move the plunger 41 from its extended position to its retracted position, and vice versa, the control stalk 10 is pivoted relative to the turn signal lever 11. When the turn signal lever 11 is so pivoted, the plunger 41 abuts the end wall 15 and is moved to a compressed position within the switch 40, as illustrated in FIG. 3. When the turn signal lever 41 is released, the control stalk 10 returns to its first position by virtue of the springs 35a and 35b, but the plunger 41 moves back only to its retracted position. By pivoting the control stalk 10 from its first position to its second position and back again a second time, the plunger 41 is moved from its retracted position to its extended position. Thus, repeated pivoting of the control stalk 10 causes the plunger 41 to alternate between its extended position to its retracted position. The two positions of the plunger 41 can represent two operating conditions of the electrical switch 40, namely, opened and closed. Electrical switches of this construction and operation are commonly available on the market.

The switch 40 can be connected, by means of electrical contacts 42 (only one is illustrated) and wires (not shown) to control the operating condition of the headlights. For example, when the plunger 41 is in its extended position, the headlights can be operated at low beam. By pivoting the control stalk 10 relative to the turn signal lever 11 and releasing it, the plunger 41 can be moved to its retracted position, wherein the headlights are operated at high beam. By repeating this process, the headlights can be returned to their low beam operation. Thus, it will be appreciated that the present invention provides a means for changing the operating condition of the headlights as an integral part of the control stalk 10 which is quite simple and comfortable in operation.

Although the present invention can be utilized on virtually any type of vehicle, it is particularly well suited for vehicles which include the older floor mounted type of headlight dimmer switch. As mentioned above, most modern automobiles utilize a pivotable turn signal lever type of headlight switch. The present invention can be quickly and easily installed on vehicles containing the older type of headlight dimmer switch, thus providing a safer and more modern means for changing the operating condition of the headlights. To perform such an installation, the steering wheel 13 is first removed from the steering column 12. The existing turn signal lever (not shown) is next removed from the existing turn signal switch assembly within the steering column 12, and the turn signal lever 11 of the present invention is connected thereto in its stead. Whatever wires that may be required to connect the first, second, and third switch assemblies 16, 20, and 25 to their respective controlled devices can be fed through the hollow turn signal lever 11 and down the steering column 12 to the appropriate devices. The steering wheel 13 is lastly replaced on the steering column 12.

In accordance with the provisions of the patent statutes, the principle and mode of operation of the present invention have been explained and illustrated in its preferred embodiment. However, it must be understood that the present invention can be practiced otherwise than as specifically explained and illustrated without departing from its spirit or scope.

What is claimed is:

1. A switch mechanism mounted on a turn signal lever of a vehicle comprising:
    a hollow housing defining an interior, said housing including an end wall having an aperture formed therethrough, the turn signal lever extending through said housing end wall aperture into said interior of said housing;
    a switch mounting assembly secured to the turn signal lever within said interior of said housing;
    means for pivotally connecting said switch mounting assembly to said housing; and
    switch means carried by said switch mounting assembly and engageable with said end wall when said housing is pivoted from a first position to a second position relative to said switch mounting assembly for changing the operating condition of said switch means.

2. The invention defined in claim 1 wherein said switch mounting assembly includes a central aperture formed therethrough and the turn signal lever includes a knurled end portion sized to fit snugly within said central aperture so as to prevent relative movement therebetween.

3. The invention defined in claim 1 wherein said means for pivotally connecting said switch mounting assembly to said housing includes a pivot pin extending through respective pivot apertures formed in said switch mounting assembly and said housing.

4. The invention defined in claim 1 wherein said housing end wall aperture is tapered so as to permit said housing to pivot from said first position to said second position relative to the turn signal lever.

5. The invention defined in claim 1 further including means for urging said housing toward said first position relative to the turn signal lever while permitting said housing to be pivoted toward said second position relative to the turn signal lever.

6. The invention defined in claim 5 wherein said means for urging includes spring means disposed between said switch assembly and said housing end wall.

7. The invention defined in claim 6 wherein said spring means includes a pair of springs, each spring maintained at one end in a recess formed in said switch mounting assembly and at an opposite end in a recess formed in said housing end wall.

8. The invention defined in claim 1 wherein said switch means includes a moveable plunger adapted to abut said housing end wall during said pivoting thereof, said plunger being moveable between a first extended position and a second retracted position.

9. The invention defined in claim 8 further including means for connecting said switch means to a controlled device within the vehicle.

10. A switch mechanism mounted on the outermost end of a turn signal lever extending outwardly from a steering column of a vehicle comprising:
 an elongated housing including an aperture formed through an innermost end wall thereof;
 a switch mounting assembly disposed within said housing, said switch mounting assembly being secured to the outermost end portion of the turn signal lever which extends through said housing end wall aperture to said switch mounting assembly;
 means for pivotally connecting said switch mounting assembly to said housing; and
 switch means carried by said switch mounting assembly and engageable with said end wall when said housing is pivoted from a first position to a second position relative to said switch mounting assembly for changing the operating condition of said switch means.

11. The invention defined in claim 10 wherein said means for pivotally connecting said switch mounting assembly to said housing includes a pivot pin extending through respective pivot apertures formed in said switch mounting assembly and said housing.

12. The invention defined in claim 10 wherein said housing end wall aperture is tapered so as to permit said housing to pivot from a first position to said second position relative to the turn signal lever.

13. The invention defined in claim 10 further including means for urging said housing toward said first position relative to the turn signal lever while permitting said housing to be pivoted toward said second position relative to the turn signal lever.

14. The invention defined in claim 13 wherein said means for urging includes spring means disposed between said switch mounting assembly and said housing end wall.

15. The invention defined in claim 14 wherein said spring means includes a pair of springs, each spring maintained at one end in a recess formed in said switch assembly and at an opposite end in a recess formed in said housing end wall.

16. The invention defined in claim 11 wherein said switch means includes a moveable plunger adapted to abut said housing end wall during said pivoting thereof, said plunger being moveable between an extended position and a retracted position.

17. The invention defined in claim 16 further including means for connecting said switch means to a controlled device within the vehicle.

18. A multiple function control stalk mounted on the outermost end of a turn signal lever extending outwardly from a steering column of a vehicle for controlling the operation of a plurality of controlled devices within the vehicle comprising:
 an elongated housing including an aperture formed through an innermost end wall thereof;
 a first switch mounting assembly disposed within said housing for controlling the operation of a first one of the plurality of control devices;
 a second switch mounting assembly disposed within said housing for controlling the operation of a second one of the plurality of controlled devices;
 a third switch mounting assembly disposed within said housing for controlling the operation of a third one of the plurality of controlled devices, said third switch mounting assembly being secured to the outermost end portion of the turn signal lever, the turn signal lever extending through said housing end wall aperture to said third switch mounting assembly;
 means for pivotally connecting said third switch mounting assembly to said housing such that said housing is movable between a first position, wherein said housing is longitudinally aligned with the turn signal lever and said third switch mounting assembly, and a second position, wherein said housing is disposed at an angle relative to the turn signal lever and said third switch moutning assembly;
 electrical switch means carried by said third switch mounting assembly and connected to the third one of the controlled devices, said electrical switch means being engageable with said end wall when said housing is pivoted from said first position to said second position for moving said electrical switch means from an opened position to a closed position so as to control the operation of the third one of the controlled devices; and
 means for urging said housing toward said first position relative to the turn signal lever while permitting said housing to be pivoted toward said second position relative to the turn signal lever.

19. The invention defined in claim 18 wherein said means for urging includes a pair of springs, each spring maintained at one end in a recess formed in said third switch mounting assembly and at an opposite end in a recess formed in said housing end wall.

* * * * *